United States Patent

[11] 3,561,553

| | | | |
|---|---|---|---|
| [72] | Inventor | Otto J. Blubaugh Columbus, Ohio | |
| [21] | Appl. No. | 748,390 | |
| [22] | Filed | July 29, 1968 | |
| [45] | Patented | Feb. 9, 1971 | |
| [73] | Assignee | Jeffrey Galion Inc. a corporation of Ohio | |

[54] LOAD-MEASURING SYSTEM
5 Claims, 6 Drawing Figs.

[52] U.S. Cl. .................................................. 177/168, 177/229, 177/255, 177/16
[51] Int. Cl. ................................................ G01g 11/00, G01g 23/14, G01g 21/24
[50] Field of Search ........................................... 177/16, 255, 225, 229 (Bearings Digest), 196, 164, 168—170

[56] References Cited
UNITED STATES PATENTS

| 2,981,100 | 4/1961 | Johnson | 177/Scale Bearings |
| 3,148,742 | 9/1964 | Giulie | 177/168X |
| 3,163,248 | 12/1964 | Farquhar | 177/Scale Bearings |
| 3,182,495 | 5/1965 | Johnson | 177/229X |
| 3,358,502 | 12/1967 | Johnson | 177/229X |
| 3,371,731 | 3/1968 | Connors et al. | 177/225X |
| 3,387,679 | 6/1968 | Giulie et al. | 177/164 |
| 3,443,653 | 5/1969 | Marshall | 177/255X |

FOREIGN PATENTS

| 654,620 | 6/1963 | Italy | 177/Scale Bearings |

Primary Examiner—Robert S. Ward, Jr.
Attorney—David Young

ABSTRACT: A force-measuring system in which the force of a load of material is applied to a load-responsive element to produce a signal proportional to the weight of material. There is a load beam by which the force is applied to the load-responsive element. A counterbalance beam is connected to the load beam to counterbalance at least a part of the static weight that would otherwise be applied to the load responsive element. The force-measuring system is compactly constructed, and the elements are highly stabilized to be accurately responsive.

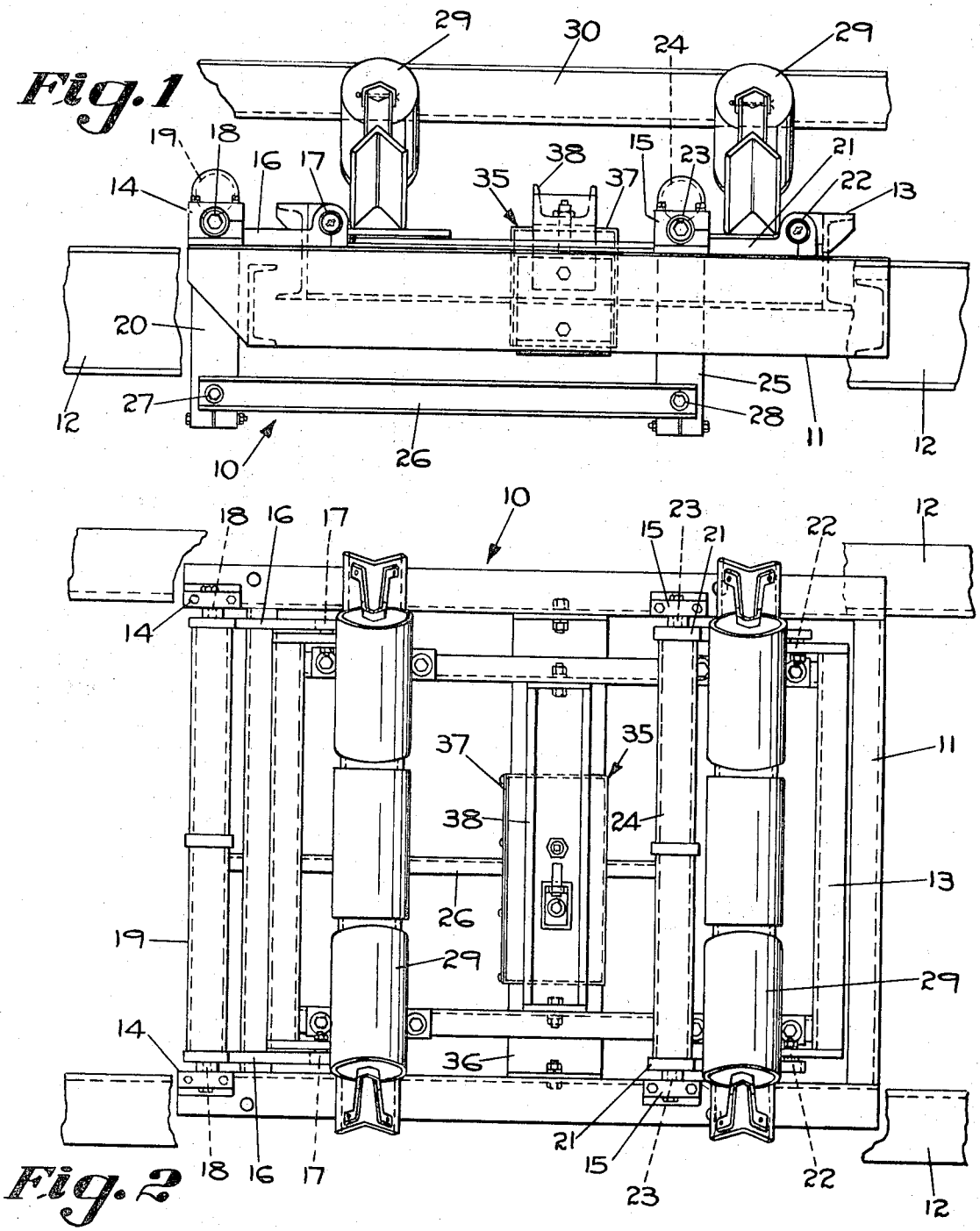

INVENTOR;
OTTO J. BLUBAUGH,
BY David Young
ATTORNEY.

INVENTOR;
OTTO J. BLUBAUGH,
BY David Young
ATTORNEY.

LOAD-MEASURING SYSTEM

The instant invention relates to a force-measuring system in which a load is applied to a load-responsive element to measure the magnitude of the load.

One application of the load-measuring system is in a belt conveyor weighing apparatus to measure the weight of material carried by the conveyor belt. In the belt conveyor there is a line of idler rollers on which the conveyor belt travels with the material. A belt scale is interposed in the run of the conveyor belt, for example, as illustrated in the patent to Otto J. Blubaugh, No. 3,331,457, July 18, 1967, for Belt Conveyor Weighing Apparatus.

The belt conveyor scale includes several idler rollers over which the belt and its load run, and such load is transmitted through the scale to a load-responsive element to produce a signal that is proportional to the weight of material carried by the conveyor belt. The signal is transmitted to recording or weight indicating instrumentation to record or display the weight of material carried by the conveyor belt.

It is required that the load-responsive element accurately respond to the weight of material on the conveyor belt. This requires a highly stabilized system, in which the movements of the elements under the force of the load respond accurately and directly to such force. The force-measuring system is disposed within the confines of the belt conveyor scale, and therefore, must be of a compact construction.

It is an object of this invention to provide an improved force measuring system that is accurately responsive to applied forces.

It is another object to provide an improved force measuring system with a load-responsive element that provides a signal that is proportional to the force of a load, by small increments of movement of the elements of the system.

It is a further object to provide an improved force measuring system in which the elements are stabilized to accurately respond to small increments of movement produced by the applied force.

It is also an object to provide an improved force-measuring system in which there is a counterbalance for static weight.

It is still another object to provide an improved force-measuring system which is compactly constructed to form a small package.

Other objects of the invention will appear hereinafter, the novel features and combinations being set forth in the appended claims.

In the drawings:

FIG. 1 is an elevation view of a belt conveyor scale to which the force measuring system is applied;

FIG. 2 is a plan view of the belt conveyor scale with the force-measuring system;

Figure 3:
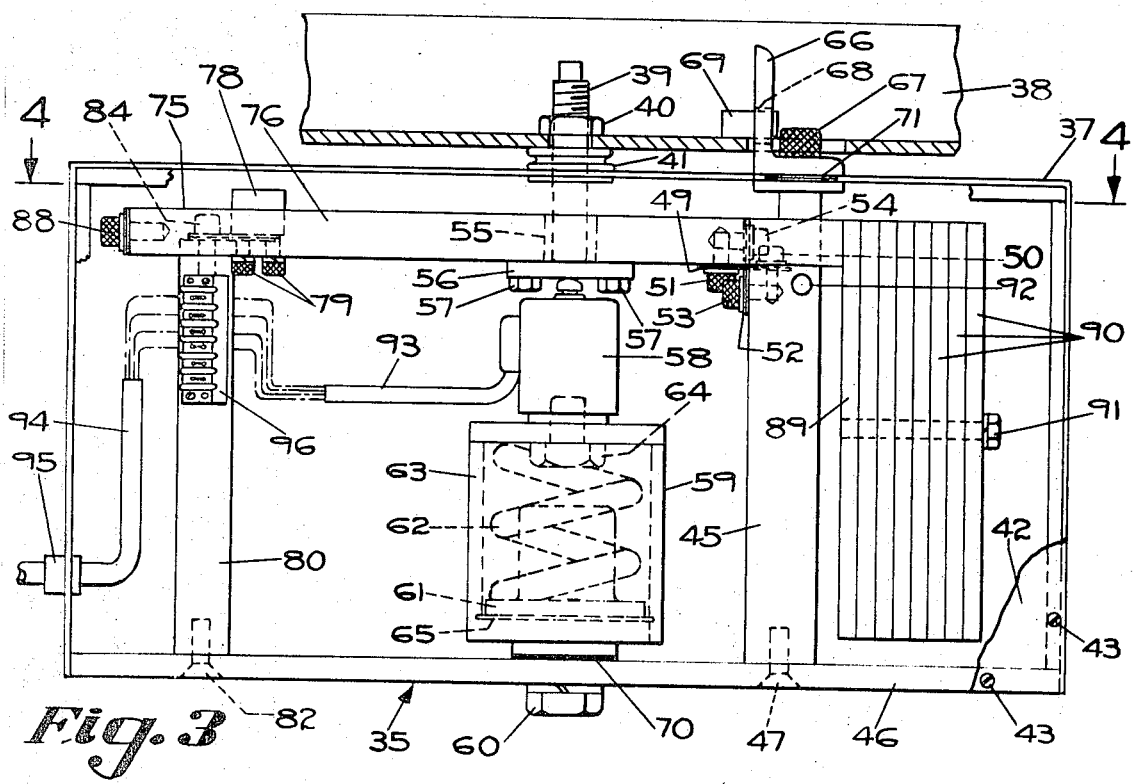
FIG. 3 is an elevation view of the force-measuring system.
Figure 4:
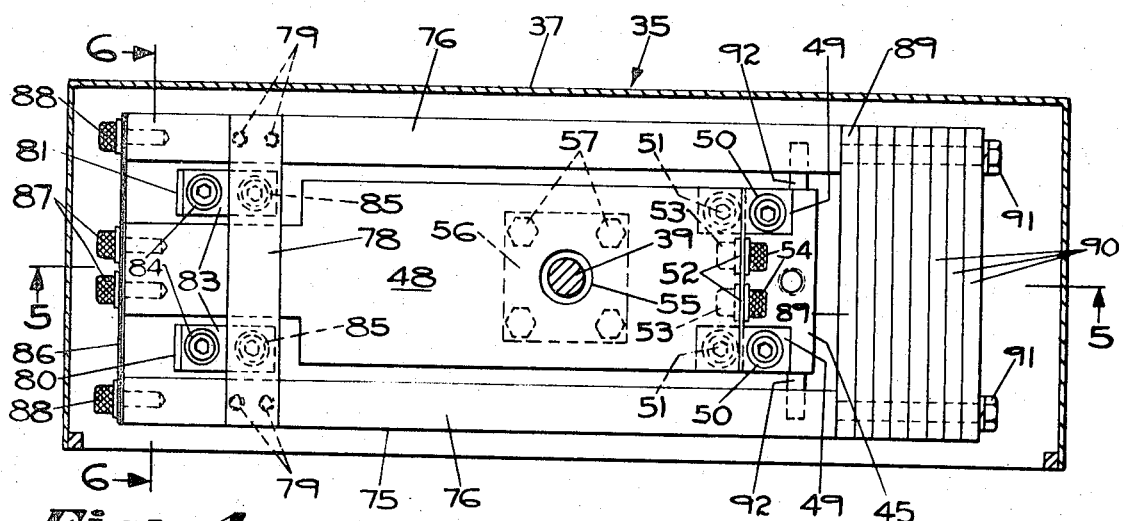
FIG. 4 is a section view of the line 4—4 in FIG. 3.

In FIGS. 1 and 2, there is illustrated a belt conveyor scale 10 with a fixed outer frame 11 secured to the side rails 12,12 of the belt conveyor. A movable frame 13 is within the outer frame 11. Pivot blocks 14,14 are secured to one end of the outer frame 11, and similar pivot blocks 15,15 are secured near the other end of the outer frame 11. The movable frame 13 is suspended within the outer frame 11 by a stabilizer linkage that constrains the movable frame 13 for level movement relatively to the outer frame 11. The stabilizer linkage has similar links 16,16 at opposite sides, which are pivotally connected to the movable frame 13 by opposite pivots 17,17. The links 16,16 are pivotally secured to the opposite pivot blocks 14,14 on pivots 18,18. A transverse tube 19 is fixedly secured between the opposite links 16,16 thereby unitizing the latter, and a leg 20 depends from the tube 19.

At the opposite end of the movable frame 13 there are links 21,21, that are like the links 16,16, and these are pivotally connected to the movable frame 13 by pivots 22,22. The links 21,21 are pivotally secured to the pivot blocks 15,15 by pivots 23,23. A transverse tube 24 is fixedly secured between the links 21,21 to unitize the latter, and a leg 25 depends from the tube 24. A transverse link 26 is pivotally secured to the depending legs 20, 25 at pivots 27, 28, respectively, as a constraining element. Links 16,16 and links 21,21 at the opposite ends of the movable frame 13 are disposed in a common plane, and the link 26 constrains the movement of the movable frame 13 to be level and to have a uniform response to the force of the load of material on the conveyor belt 30.

Several idler rollers 29,29 are secured to the movable frame 13, and the conveyor belt 30 moves across them with the material. The force of the load of material on the conveyor belt 30 is transmitted through the idler rollers 29,29 to the movable frame 13, which moves downwardly, and such downward movement is constrained by links 16,16, links 21,21, and link 26 to be level.

The movement of the movable frame 13 is utilized to measure the weight of material on the conveyor belt 30, and this movement is communicated to a force-measuring system 35 on a transverse platform 36 secured to the outer frame 11. The force measuring system 35 is totally enclosed within a housing 37 which protects its elements from physical damage, and from accumulation of dust and other foreign materials which could detrimentally affect the operation of the elements.

There is a transverse member 38 fixedly secured to the movable frame 13 at a midposition. A nut 40 is fixedly secured to the transverse member 38, and a hole in the latter is aligned with the threaded hole of the nut 40, as seen in FIG. 3. A threaded rod 39 is turned into the nut 40, and extends down through member 38 and through an opening in the housing 37 to transmit the movement of the movable frame 13. A flexible boot 41 is secured to the transverse member 38 and to the housing 37 to seal around the rod 39. The threaded rod 39 may be turned in the nut 40 for adjustment, as will be described hereafter.

Figure 5:
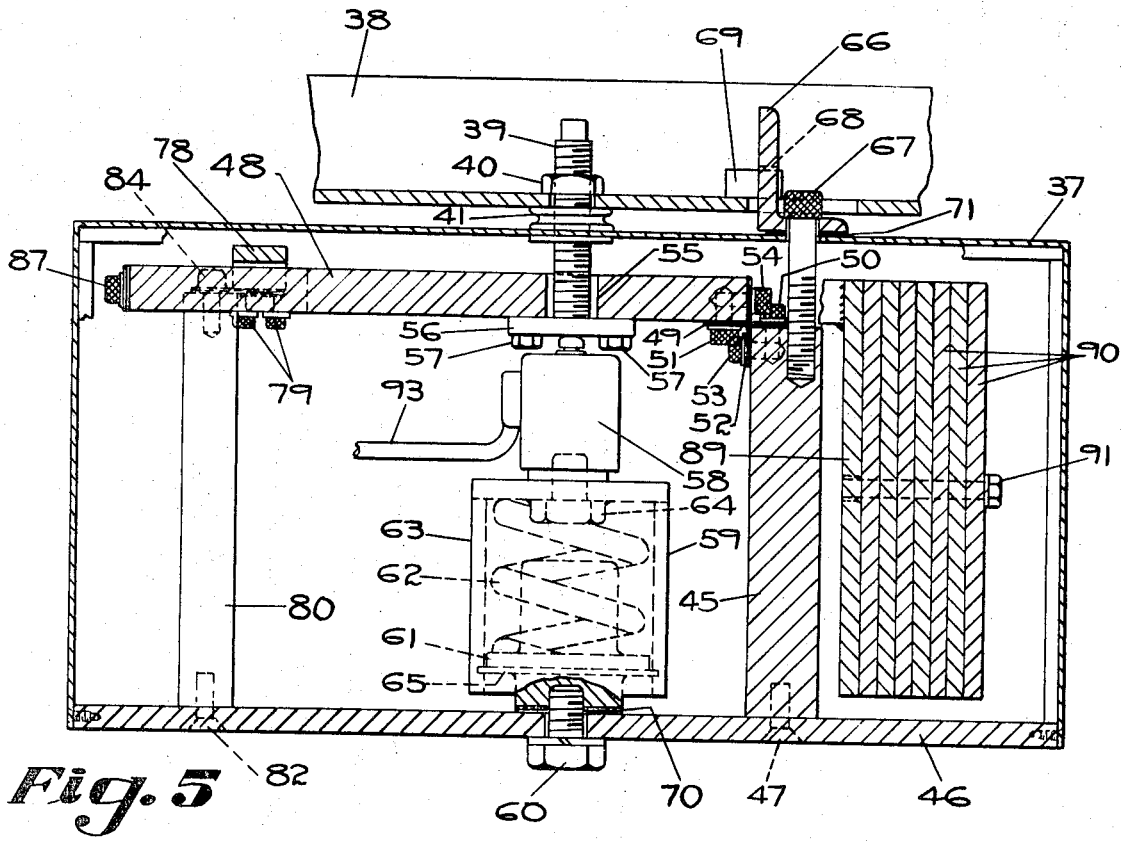
FIG. 5 is a section view on the line 5—5 in FIG. 4.
Figure 6:
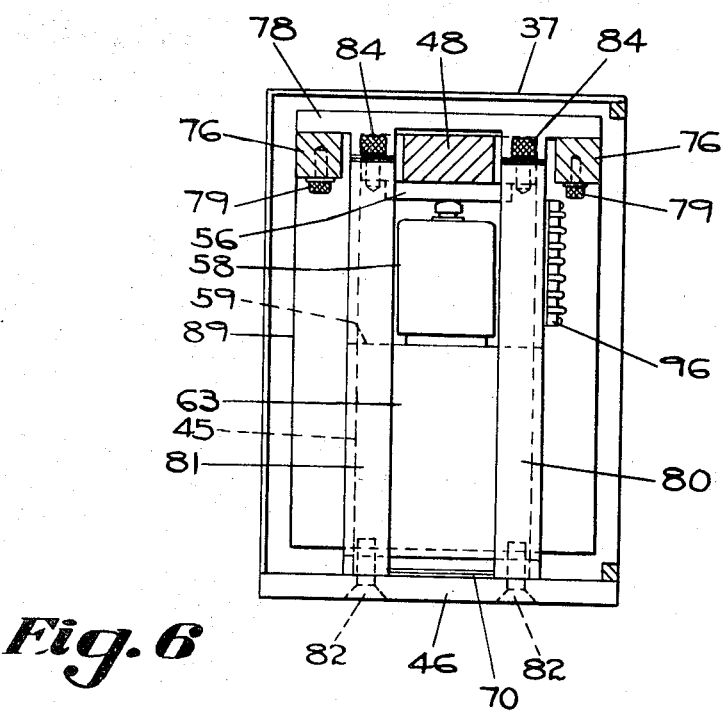
FIG. 6 is a section view on the line 6—6 in FIG. 4.

The force-measuring system 35 is illustrated in FIGS. 3, 4, 5 and 6. The housing 37 has a cover 42 secured in place by a plurality of screws 43 to permit removal. There is an upright post 45 fixedly secured to the base 46 by capscrews 47. A load beam 48 is at the top of the upright post 45 and extends laterally from the latter. The relative disposition of the upright post 45 and the load beam 48 is such that they have adjacent corners, as best seen in FIG. 5. Two flexure elements 49,49 extend from the upper transverse surface of the post 45 to the bottom transverse surface of the load beam 48. Screws 50,50 fixedly secure the flexure elements 49,49 to the post 45, and similar screws 51,51 fixedly secure the flexure elements 49,49 to the load beam 48.

Two flexure elements 52,52 extend between an upright side surface of the post 45 and an upright end surface of the load beam 48. The flexure elements 52,52 are fixedly secured to the post 45 by screws 53,53, and are fixedly secured to the load beam 48 by screws 54,54. The respective flexure elements 49,52 are alike, and may be formed from blue clock spring steel. Each flexure element may be a single piece of material, or may be formed of several pieces of material that are stacked. The transverse flexure elements 49,49 prevent movement of the load beam 48 in the transverse direction, and the flexure elements 52,52 prevent movement of the load beam 48 in the upright direction. In this sense, the load beam 48 is fixed relatively to the post 45 for stabilization of the system.

The flexure elements 49,49 and the flexure elements 52,52 are disposed in planes which cross at the adjacent corners of the post 45 and the load beam 48 to define a fixed pivot axis at the junction, and the load beam 48 is yieldable by swinging movement about such pivot axis. The load beam 48 has a large hole 55 below which there is a hard plate 56 secured by a plurality of screws 57. The threaded rod 39 extends through the hole 55 and abuts the top of the plate 56. The bottom of the plate 56 bears against a load cell 58, which is the load responsive element. Below the load cell 58 there is a spring cartridge 59 secured to the base 46 by a screw 60. There is an internal spring support 61 and a spring 62, which is compressed between the spring support 61 and the spring case 63. The load cell 58 is secured to the spring case 63 by a screw 64. Spring support 61 is retained in the spring case by retaining ring 65. The spring cartridge 59 is a safety device to prevent overloading of the load cell 58. Spring 62 may be precompressed to about 90 percent of the capacity of the load cell 58. If a force is applied to the load cell 58, which is greater than 90 percent of its capacity, the spring cartridge 59 will yield.

In conjunction with the yielding of the spring cartridge 59, there is a mechanical stop with an upright stop plate 66 secured to the housing 37 by a screw 67 threaded into the upright post 45. The stop plate 66 has an aperture 68 to receive a pin 69, which is fixedly secured to the transverse member 38. The aperture 68 is a larger diameter than the pin 69, determines the limit of movement of the transverse member 38 and the movable frame 13 relatively to the force-measuring system 35. With the spring cartridge 59 prestressed to 90 percent of the load capacity of the load cell 58, force beyond this limit will produce a displacement of the load cell 58 by further compression of the spring 62, until the stop pin 69 abuts the aperture 68 of the stop plate 66, thereby preventing further movement of the elements.

In setting up the force-measuring system 35 in the belt conveyor scale 10, it is necessary to adjust the positions of the elements relatively to each other. The rod 39 may be turned in the fixed nut 40 until it abuts the bearing plate 56, to provide positive contact between the transverse member 38 of the movable frame 13 and the force-measuring system 35. Below the spring cartridge 59, shims 70 may be placed, as needed, to provide the positive contact between the bearing plate 56 and the load cell 58. Below the stop plate 66, shims 71 may be placed, as needed, to properly locate the aperture 68 relatively to the pin 69 for the appropriate limit of movement.

The force-measuring system 35 includes counterbalance for at least a part of the static weight including the movable frame 13, the idler rollers 29 and the conveyor belt 30, it being understood that it is desired to provide a reading of the weight of material only. Such counterbalance includes a counterbalance beam 75 formed with bars 76,76 on opposite sides of the load beam 48, and these extend along the latter from the outer end of the load beam 48 in the opposite direction to a position beyond the post 45. The bars 76,76 are connected by a crossbar 78 that is fixedly secured to the bars 76,76 by a plurality of screws 79,79. Upright posts 80,80 are inwardly from the ends of the bars 76,76 and are secured to the base 46 by screws 82,82. Transversely disposed flexure elements 83,83 are secured to the tops of the posts 80,80 by screws 84,84 and are fixedly secured to a bottom surface of the crossbar 78 by screws 85,85.

The transverse flexure elements 83,83 support the counterbalance beam 75 on the upright posts 80,80 and provide a pivotal connection of the latter that permits swinging movement of the counterbalance beam 75 relatively to the posts 80,80. The flexure elements 83,83 may be constructed like the flexure elements 49,52 and of the same material, as a single piece or as several stacked pieces. The one end of the counterbalance beam 75 is aligned with the outer end of the load beam 48, and these are secured by an upright transverse flexure element 86 that is fixedly secured to the outer end of the load beam 48 by screws 87,87, and is fixedly secured to the end of the counterbalance beam 75 by screws 88,88. The flexure element 86 may also be formed of blue clock spring steel, and may be a single element or several stacked elements.

The opposite end of the counterbalance beam 75, beyond the upright post 45, has a plate 89, which is fixedly secured to the ends of the bars 76,76. A plurality of similar plates 90,90 are secured to the first plate 89 by screws 91,91. The several plates 89,90 are the counterweight, and the appropriate number of plates 90 are attached to make up the desired counterweight on the counterbalance beam 75. Pins 92,92 extend laterally from the opposite sides of the post 45 below the bars 76,76 to provide stops that prevent the counterbalance beam 75 from falling during handling or servicing of the force-measuring system 35.

The counterbalance beam 75 operates to apply upward force to the outer end of the load beam 48, acting through the flexure element 86 which flexes torsionally between the counterbalance beam 75 and the load beam 48. The force of the counterbalance beam 75, as thus applied to the load beam 48, counterbalances the static or tare weight that would otherwise be applied to the load cell 58. In practice, it is preferred to counterbalance only a part of the static weight, in order to provide a preloading of the load cell 58. Customarily, the best response is obtained in the middle range of operation of the load cell 58, and such partial counterbalancing sets up the load cell 58 to provide signals in its middle range of operation. A further advantage of the counterbalancing of the static weight is that a smaller load cell may be utilized in the force measuring system 35, since the load cell is relieved of this part of the weight. A terminal board 96 to secured to one post 80, and the line 93 from the load cell 58 has its leads connected to the terminal board 96. Another line 94 has its leads also connected to the terminal board 96 and is led out of the housing 37 through cable connector 95.

The force-measuring system 35 is compactly constructed as a small unit in which the elements are highly stabilized to accurately respond to small increments of movement produced by the force of the load of material. Such small increments of movement are transmitted through the load beam to the load-responsive element to produce the signal that is proportional to the weight of material. A counterbalance beam is connected to the load beam and acts to counterbalance a part of the static weight, which relieves the load cell of this part of the static weight.

Obviously those skilled in the art may make various changes in the details and arrangement of parts without departing from the spirit and scope of the invention as defined by the claims hereto appended, and applicant therefore wishes not to be restricted to the precise construction herein disclosed.

I claim:

1. A load measuring system including a load-responsive element which provides a signal that is proportional to the magnitude of the load, a load beam bearing on said load-responsive element, means to apply the load to said load beam for transmitting the force of the load to said load-responsive element, a fixed support for said load beam, a first flexure element to connect said load beam to said fixed support in a transverse plane, a second flexure element to connect said load beam to said fixed support in an upright plane, the transverse plane of said first flexure element and the upright plane of said second flexure element are placed in intersecting disposition and establish a pivot position for said load beam at the intersection of said transverse plane with said upright plane to permit the load beam to yield in response to the force of the load, counterbalance means to at least partially counterbalance the load that is applied to said load beam, said counterbalance means comprises a counterbalance beam, means to connect said counterbalance beam to said load beam to oppose movement of the load beam which is produced by the force of the load that is applied to the load beam, said load beam extends laterally from said fixed support, said counterbalance beam extends laterally from the outer end of said load beam and along the load beam in the opposite direction to a position located beyond said fixed support, a counterweight on the counterbalance beam at said position that is beyond said fixed support, a third flexure element for said counterbalance beam that is disposed at an intermediate position between the ends of the counterbalance beam to yieldably support the latter, a fourth flexure element connecting the outer end of said load beam to the adjacent end of said counterbalance beam at a position that is spaced from said third flexure element.

2. A load-measuring system including a load-responsive element which provides a signal that is proportional to the magnitude of the load, an upright post at one side of the load-responsive element, a load beam extending laterally from said upright post to a position at the opposite side of said load-responsive element, said load beam bearing on said load-responsive element, a first leaf spring flexure element to connect said load beam to said upright post in a transverse plane, a second leaf spring flexure element to connect said load beam to said upright post in an upright plane, the transverse plane of said first flexure element and the upright plane of said second flexure element are placed in intersecting disposition and establish a pivot position for said load beam at the intersection of said transverse plane with said upright plane to permit the load beam to yield in response to the force of the load, a counterbalance beam disposed at opposite sides of said load beam and extending laterally along the load beam to a position beyond said upright post, a counterweight on said counterbalance beam at said position beyond said upright post, a fixed support for said counterbalance beam, a third leaf spring flexure element to connect said counterbalance beam to the last said fixed support to yieldably support the counterbalance beam on its fixed support, a fourth leaf spring flexure element to connect said load beam and said counterbalance beam to oppose movement of said load beam by the counterbalance beam which acts in the opposite direction from said load beam under the force of said counterweight.

3. A load-measuring system as recited in claim 2, in which said load beam comprises a bar that extends over said load-responsive element, said counterbalance beam comprises two bars that are disposed one on each side of the load beam, said fourth leaf spring flexure element is secured to adjacent ends of the load beam bar and the counterbalance beam bars, and said counterweight is secured to the ends of said counterbalance beam bars beyond said first upright post.

4. A load-measuring system as recited in claim 3, including a crossbar secured to said counterbalance beam bars, and said third flexure element is secured to said crossbar and to the last said fixed support.

5. A load-measuring system as recited in claim 2, in which said first flexure element is secured to a transverse upper surface of said upright post and is secured to a transverse under surface of said load beam, said second flexure element is secured to an upright side surface of said upright post and is secured to an upright end surface of said load beam.